US006752403B2

(12) United States Patent
Allen et al.

(10) Patent No.: US 6,752,403 B2
(45) Date of Patent: Jun. 22, 2004

(54) WORKING APPARATUS

(75) Inventors: Walter Roy Allen, Rocester (GB); Ian Harrold Carswell, Rocester (GB); Phillip Jackson, Dudley (GB); Dominic Francis Marten Simpson, Leamington Spa (GB); Timothy Boothroyd, Clwyd (GB); Peter Jowett, Rocester (GB)

(73) Assignee: J.C. Bamford Excavators Ltd., Staffordshire (GB)

( * ) Notice: Subject to any disclaimer, the term of this patent is extended or adjusted under 35 U.S.C. 154(b) by 87 days.

(21) Appl. No.: 09/770,024

(22) Filed: Jan. 25, 2001

(65) Prior Publication Data

US 2001/0024021 A1 Sep. 27, 2001

(30) Foreign Application Priority Data

Feb. 1, 2000 (GB) .............................................. 0002154
Aug. 30, 2000 (GB) .............................................. 0021217

(51) Int. Cl.$^7$ ............................................ B60G 17/00
(52) U.S. Cl. ................................ 280/6.157; 180/89.12; 280/124.1; 280/124.11; 280/124.109; 280/124.158
(58) Field of Search ............................ 280/6.157, 6.15, 280/124.158, FOR 165, 124.1, 124.109, 124.11, 6.153, 6.154; 180/89.12

(56) References Cited

U.S. PATENT DOCUMENTS 2,844,386 A * 7/1958 Pribonic 6,322,090 B1 * 11/2001 Chignoli et al. ...... 280/124.157

FOREIGN PATENT DOCUMENTS

| CA | 2278948 | 1/2000 |
|----|---------|--------|
| EP | 1 022 166 A2 | 7/2000 |
| GB | 1012159 A | 8/1965 |
| WO | WO 89/00928 | 2/1989 |
| WO | WO 00/07925 A1 | 2/2000 |

OTHER PUBLICATIONS

Patent abstract of Japan vol. 1995, No. 05, Jun. 30, 1995 & JP 07 032843.

* cited by examiner

Primary Examiner—Eric Culbreth
(74) Attorney, Agent, or Firm—Marshall, Gerstein & Borun LLP

(57) ABSTRACT

A working apparatus includes a body, an engine, axles each carrying ground engaging wheels or tracks for moving the apparatus over the ground, an operator's cab mounted on the body, and at least one working arm supported at or adjacent one end on the body at a position for movement relative to the body, the arm being adapted to carry a working implement at or adjacent a second end thereof, and wherein one of the front and rear axles is suspended from the body by a suspension system which is adjustable independently of the other axle to raise the body to a fully raised position in which an uppermost part of the body is at a maximum height above the ground and a fully lowered position in which an uppermost part of the body is at a minimum height above the ground.

24 Claims, 9 Drawing Sheets

//WORKING APPARATUS

BACKGROUND TO THE INVENTION

This invention relates to working apparatus of the kind which is movable under its own power over the ground and has a working arm such as a loader arm, or arms, which carries a working implement.

Such apparatus are popularly used for examples only on building sites to load and unload building materials etc., and in the agricultural industry for loading and unloading agricultural materials.

Loader arms are known which are telescopic to allow greater reach. To enable an operator to have a sufficiently clear view for safe working when the arm is telescoped outwardly for example and a load is being handled at height, it is essential that the operator is as high up as possible. However this restricts the ability of the apparatus to be used in environments where height is restricted, such as within a freight container.

DESCRIPTION OF THE PRIOR ART

Proposals have been put forward to allow an operator's cab to be raised and lowered on a chassis of the apparatus to improve operator visibility when the cab is raised, and to achieve maximum stability when the cab is lowered.

Such apparatus may have a pair of axles carrying ground engaging means such as wheels. Typically at least one of the axles is affixed relative to a body of the apparatus by a pivot which permits the axle to pivot relative to the body in response to ground irregularities. Whereas such an arrangement may provide stability during working, such apparatus are generally transported between work sites on roads, for example on a trailer or other transporter because such apparatus are only capable of slow speed road travel because of the non-suspended body-axle connection.

To overcome this problem it has been proposed to provide a working apparatus with a suspension.

SUMMARY OF THE INVENTION

According to one aspect of the invention we provide a working apparatus including a body, a power operated motive means, a front axle and a rear axle, the axles each carrying ground engaging means on which the apparatus may move over the ground, the apparatus further including an operator's cab mounted on the body, and there being at least one working arm supported at or adjacent one end on the body at a position for movement relative to the body, the arm being adapted to carry a working implement at or adjacent a second end thereof, and wherein one of the front and rear axles is suspended from the body by suspension means which is adjustable independently of the other of the axles to raise the body relative to the one of the front and rear axles only to a fully raised position in which a plane in which an uppermost part of the body lies, is at a maximum height above the ground and a fully lowered position in which the plane is at a minimum height above the ground.

Thus a working apparatus is provided which is capable of working in an environment where height is restricted by lowering the body towards the lowermost position. The working apparatus is also capable of working in situations where the operator's cab advantageously needs to be at an elevated height, and thus the body may be raised to such an elevated position for safer working. Usually the top of the cab will be the uppermost part of the body and this will be the restricting factor on the height of the apparatus at least when the body is in the raised position. Because the front and rear suspension means or only one of the suspension means of the vehicle is adjustable to raise and lower the body between the fully raised and fully lowered positions, the apparatus may mechanically be simpler than an arrangement which may have for example, a fully adjustable suspension, and more efficient. Also there is no need to provide any means for raising/lowering the cab on the body.

The provision of a suspension means on an apparatus of the invention facilitates higher speed travel e.g. on-road but during working operations, preferably the adjustable suspension means is lockable with the body in at least one of the fully raised and fully lowered positions, so that there is no or substantially no movement of the body permitted relative to the locked axle, by the suspension means. Thus load stability is achieved during working, which is particularly important on rough terrain.

Thus with the suspension thus locked, the machine may closely resemble a conventional machine with no suspended axle. Preferably, the suspension may be locked in a range of positions to provide for different working heights. For example the adjustable suspension means may be lockable at least when the body is in a fully raised position, a fully lowered position, and in a position between the fully raised and fully lowered positions.

The suspension means may include hydraulic suspension struts each having a cylinder and a piston movable in the cylinder when the suspended axle moves relative to the body in response to irregularities in the ground as the apparatus moves over the ground, piston movements resulting in hydraulic fluid flowing into or out of the cylinder from or to a gas spring which damps piston movements. The suspension preferably is lockable for a working operation by means which prevent the flow of fluid into or out of the cylinder, although in another arrangement, the adjustable suspension may be locked out by mechanical means or otherwise.

In conjunction with such hydraulic suspension struts, if desired a level sensing arrangement may be provided, the level sensing means sensing the distance between the suspended front or rear axle and the body, with there being a height regulating means which is responsive to the respective level sensing means to adjust the distance between the axle and the body to enable the axle to be set in a reference or datum position relative to the body.

In one example the adjustable suspension includes a pair of links at either side of the body, one link of each pair being above the other relative to the ground, the upper link of each pair being pivotally connected at a first end relative to the body and at a second end to the axle at a first position and the lower link of each pair being pivotally connected at a first end relative to the body and at a second end to the axle at a second position, the second positions each being below their respective first positions.

Thus where the independently adjustable suspended front or rear axle in use transmits driving torque to the ground via the ground engaging means thereof, the suspension may be a non-reactive suspension in which there is no significant change in the vertical loading on the ground engaging means in response to changes in the driving torque applied thereto.

If desired the other of the front and rear axles may also be suspended from the body but the adjustable suspension is adjustable independently of the suspension of the other axle.

The suspension means suspending the other of the front and rear axles may include a pair of links at either side of the body, one link of each pair being above the other relative to the ground, the upper link of each pair being pivotally connected at a first end relative to the body and at a second end to the axle at a first position and the lower link of each pair being pivotally connected at a first end relative to the body and at a second end to the axle at a second position, the second positions each being below their respective first positions.

Where the apparatus is of the kind in which the ground engaging means of each of the front and rear axles are adapted to transmit driving torque to the ground, each of the front and rear axles may be suspended from the body by non-reactive suspension means.

To adapt the apparatus particularly for working operations, where the other axle is suspended, the suspension means suspending the other of the front and rear axles is preferably so as to restrict movement of a mid point of the axle towards and away from the body, whilst permitting oscillation of the axle about an axis generally perpendicular to the axle and positioned at the mid point.

As with the axle having the adjustable suspension, the suspension means suspending the other of the front and rear axles may include at least one hydraulic suspension strut at each side of the apparatus, each strut having a cylinder and a piston movable in the cylinder when the suspended axle moves relative to the body in response to irregularities in the ground as the apparatus moves over the ground, piston movements resulting in hydraulic fluid flowing into or out of the cylinder from or to a gas spring which damps piston movements. Means may be provided to connect the cylinders at each side of the apparatus so that fluid flows between the cylinders when the suspension is locked thus to achieve oscillation of the axle about the axis generally perpendicular to the axle and positioned at the mid point in response to ground irregularities.

For the other of the front and rear axles which is suspended from the body and has hydraulic suspension struts, a level sensing means may be provided at each side of the apparatus, the level sensing means sensing the distance between the axle and the body at the respective sides and there being a height regulating means for each level sensing means which is responsive to the respective level sensing means to adjust the distance between the axle and the body to enable the axle at the respective side of the apparatus to be set in a reference or datum position relative to the body.

The invention is particularly suited for use with an apparatus in which the operator's cab is provided at or adjacent a front end of the body and the front axle is suspended by the adjustable suspension such that the height of the cab is varied significantly as the body is raised and lowered by adjusting the suspension of the front axle suspension means.

As mentioned above, the top of the cab may be the highest part of the body. Thus the one end of the working arm which is supported on the body may be supported at a position located above the level of the ground engaging means but below the plane containing the uppermost part of the body.

Typically the working arm extends forwardly of the operator's cab and is moveable relative to the body about a generally horizontal axis which is located rearwardly of the operator's cab. Thus the working arm may be a loader arm which is adapted to carry a loading implement at the second end thereof, the loader arm being mounted at or adjacent one side of the body and the operator's cab being located generally at an opposite side of the body. However the invention may be applied to other kinds of working apparatus such as for examples only, excavating apparatus, excavating/loading apparatus, tractors and other agricultural vehicles where there is a requirement to lower the body relative to the ground engaging means e.g. for access.

In each case, the power operated motive means may be an engine mounted generally rearwardly or at or towards one side of the body, with there being a transmission to transmit drive to the ground engaging means carried by at least one of the front and rear axles.

To achieve steering, the front axle and/or the rear axle may be steerable. Where both the front and rear axles are steerable steering lock means may be provided to lock one of the front and rear axles in a set position so as to achieve single axle steering only when required, for example for driving on-road, with a single fully steerable ground engaging means.

According to a second aspect of the invention we provide a working apparatus including a body, a front axle and a rear axle, each axle carrying a pair of ground engaging means, one at or towards each end of the axle, front axle mounting means mounting the front axle relative to the body, and rear axle mounting means mounting the rear axle relative to the body. The working machine is operable in at least two operating modes in each of which the machine may move over the ground. The working machine includes a first mode in which the front and rear axles are suspended from the body by their respective mountings such that the front and the rear axles are movable relative to the body in response to irregularities in terrain, and a second mode in which one of the front and rear axles is suspended from the body by the respective axle mounting means whilst the other of the axles is constrained to oscillate about a longitudinal axis which is substantially fixed relative to the body in response to irregularities in terrain.

According to a third aspect of the invention we provide a working apparatus including a body, a front axle and a rear axle, each axle carrying a pair of ground engaging means, one at or towards each end of the axle, front axle mounting means mounting the front axle relative to the body, and rear axle mounting means mounting the rear axle relative to the body. The working machine is operable in at least two operating modes in each of which the machine may move over the ground. The machine includes a first mode in which the front and rear axles are suspended from the body by their respective mountings such that the front and the rear axles are movable relative to the body in response to irregularities in terrain, and a second mode in which one of the front and rear axles is held generally rigid relative to the body by the respective axle mounting means whilst the other of the axles is constrained to oscillate about a longitudinal axis which is substantially fixed relative to the body in response to irregularities in terrain.

According to a fourth aspect of the invention we provide a working machine including a body, a front axle and a rear axle, each axle carrying a pair of ground engaging means, one at or towards each end of the axle, front axle mounting means mounting the front axle relative to the body, and rear axle mounting means mounting the rear axle relative to the body. The working machine is operable in three alternative operating modes in each of which the machine may move over the ground. The working machine includes a first mode in which the front and rear axles are suspended from the body by their respective mountings such that the front and the rear axles are movable relative to the body in response to irregularities in terrain, a second mode in which one of the front and rear axles is suspended from the body by the respective axle mounting means whilst the other of the axles is constrained to oscillate relative to about a longitudinal axis which is substantially fixed relative to the body in response to irregularities in terrain, and a third mode in which one of the front and rear axles is held generally rigid relative to the body by the respective axle mounting means whilst the other of the axles is constrained to oscillate about a longitudinal axis which is substantially fixed relative to the body in response to irregularities in terrain.

According to a fifth aspect of the invention we provide a method of operating a working apparatus which includes a body, a power operated motive means, a front axle and a rear axle, the axles each carrying ground engaging means on which the apparatus may move over the ground, the apparatus further including an operator's cab mounted on the body, and there being at least one working arm supported at or adjacent one end on the body, the working arm being moveable relative to the body and being adapted to carry a working implement at or adjacent a second end thereof, and wherein at least one of the front and rear axles is suspended from the body by suspension means, the method including adjusting one only of the front and rear suspension means, to move the body relative to the ground between a fully raised position in which a plane in which an uppermost part of the body lies is at a maximum height above the ground and a fully lowered position in which the plane is at a minimum height above the ground.

Thus the body may be moved to a fully lowered position and the apparatus moved on the ground engaging propulsion means into a position where the access height is less than the height of the plane prior to the body being moved into the fully lowered position.

For higher speed travel the suspension means may be adjusted to move the body to a position between the fully raised and fully lowered positions, and for performing working operations the suspension may be fully raised or fully lowered.

At least for working operations, the adjustable suspension means may be locked so that there is no or substantially no movement of the body permitted relative to the locked axle, by the suspension means, and where the other axle is suspended from the body, the method may include locking the other axle during working operations such as to restrict movement of a mid point of the axle towards and away from the body, whilst permitting oscillation of the axle about an axis generally perpendicular to the axle and positioned at the mid point.

The method of the fifth aspect of the invention may be performed on an apparatus having any of the features of the apparatus of the first, second, third and fourth aspects of the invention.

According to a sixth aspect of the invention we provide an axle adapted to carry a pair of ground engaging means, and to mount a suspension component, characterised in that the axle includes a main body part, having a first formation by means of which a mounting member may be secured to the main body part, and the suspension component is attached to the main body part via the mounting member.

Thus by mounting suspension components via mounting members rather than on the main body part directly, a common main body part may be used in a variety of different axle suspension configurations. Thus when producing a range of working apparatus say, a common design of axle main body part may be used for the apparatus of the range, with mounting members specific to a particular axle suspension lay-out enabling the suspension components, which may for examples be suspension links, struts or dampers, to be mounted on common main axle body parts at appropriate positions.

Particularly, common configuration front and rear axle main body parts may be used, even where for example, suspension links for one axle of the apparatus are leading links, and suspension links for the other axle are trailing links.

To facilitate this, preferably the main body part of the axle is generally symmetrical so that the main axle part can be used in alternative orientations so that a component may be mounted via the mounting member to extend forwardly or rearwardly of the axle as desired. The main body part may have a plurality of formations, even on opposite sides of the main body part, which enable the mounting member to be secured to the main body part in alternative positions.

The axle may further include hubs provided at opposite ends of the axles. The hubs may be adapted to receive ground engaging wheels thereon, and may be moveable relative to the main body part to effect steering of a vehicle or machine of which the axle is a part.

According to a seventh aspect of the invention we provide a working apparatus having a front axle carrying ground engaging means and a rear axle carrying ground engaging means, at least one of the axles being an axle in accordance with the sixth aspect of the invention.

Desirably both the front and the rear axles are axles in accordance with the sixth aspect of the invention and the main body parts of the front and rear axles are of a common configuration, with appropriately different mounting members each for mounting front or rear suspension components to the axles.

BRIEF DESCRIPTION OF THE DRAWINGS

The invention will now be described with reference to the accompanying drawings in which.

DESCRIPTION OF THE PREFERRED EMBODIMENTS

Figure 1:
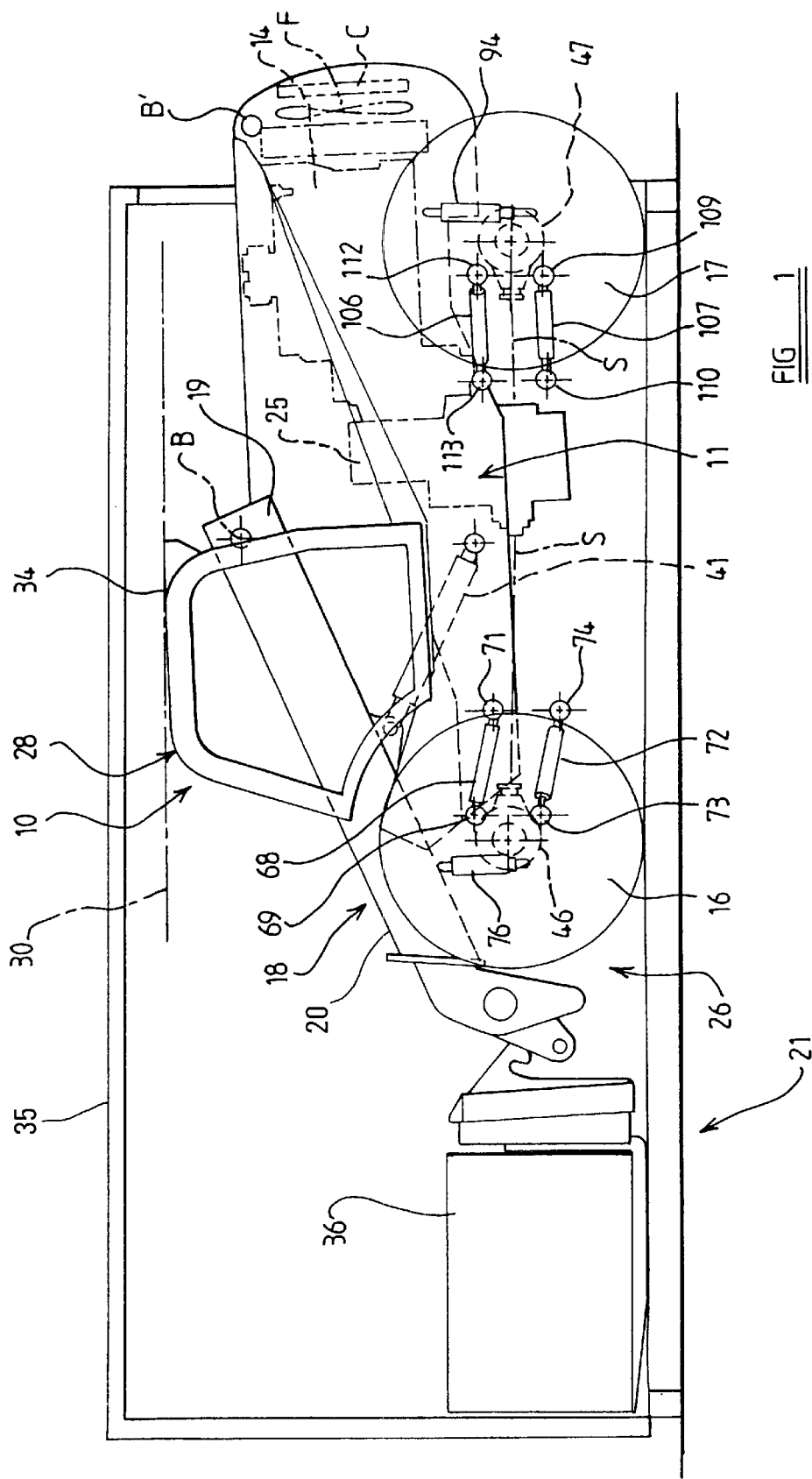
FIG. 1 is an illustrative side view of a working apparatus in accordance with the invention shown with a working arm thereof in a lowered position, the apparatus being shown with a body thereof in a fully lowered working mode position, with the apparatus working within a freight container.

Referring to FIGS. 1 to 6 of the drawings, a working apparatus, in this example a load handling apparatus 10, includes a body 11 at a rear end of which there is provided a power operated motive means which in this embodiment is a longitudinally disposed engine 14. In another example the engine 14 could be arranged transversely relative to a centre line A of the apparatus 10, e.g. at a side of the body 11, or otherwise as desired. Instead of an engine, a motor or some other suitable power operated motive means could alternatively be provided.

The engine 14 is operative to provide driving torque to front 16, or rear 17, or front and rear drive wheels 16,17, as hereinafter described, and to provide power to drive a hydraulic pump Pu (seen in FIGS. 5 and 6 only) which provides pressurised fluid to operate actuators as hereinafter described.

Supported on the body 11 is a telescopically extendible loader arm 18. The loader arm 18 is arranged at one side of the body 11 as can be seen best in FIG. 4, and is mounted adjacent a first end 19 on the body 11 for upward and downward movement about a generally horizontal axis B. In another arrangement a longer arm 18 than that shown may be used, e.g. pivoted to the body 11 more rearwardly, e.g. as indicated at position B'.

At a second opposite end 20 of the loader arm 18 there is provided a loading implement 21 which in this example is a pair of loading forks 22,23 on a carriage 24, but could be an alternative kind of loading implement such as for example only, a loading bucket. In another kind of working apparatus, such as an excavating apparatus, the working implement could be an excavating tool (bucket) or a breaking tool for examples only.

Figure 2:
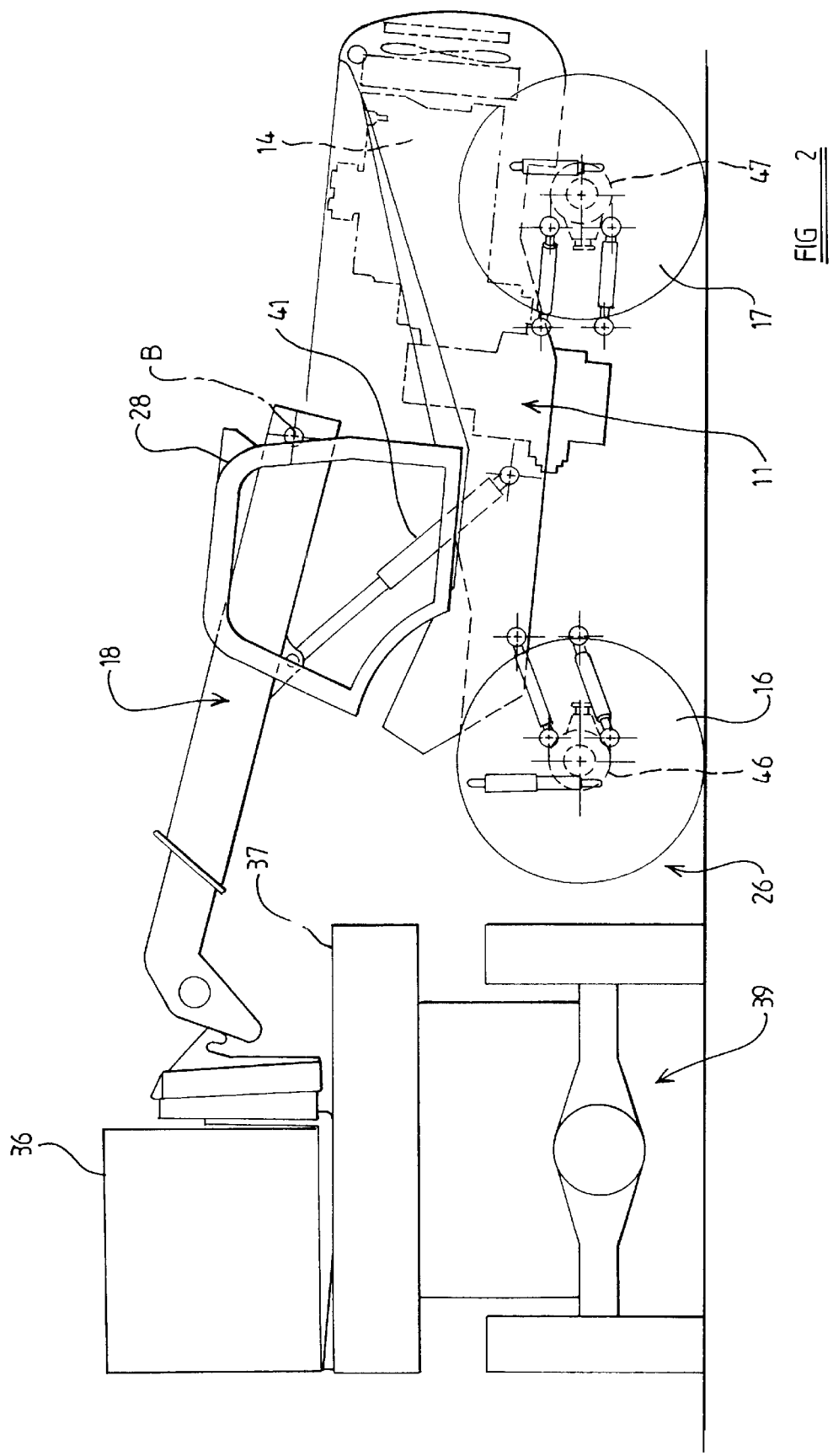
FIG. 2 is a similar view to FIG. 1 but showing the body in a fully raised working mode position, with the apparatus working alongside a lorry.

The loader arm 18 may be telescopically extended by any desired means such as one or more fluid operated actuators (not shown) between a retracted condition as seen in FIG. 1 and an extended condition shown in FIG. 2.

Mounted towards a front end 26 of the body 11, at an opposite side of the body 11 to the arm 18, there is an operator's cab 28 from which the apparatus 10 may be controlled. Within the cab 28 there is a steering control, such as a steering wheel, and the usual engine and actuator controls.

It can be seen from FIG. 1 that a top part 34 of the cab 28 is the uppermost part of the apparatus 10 at least when the loading arm 18 is lowered. The top part 34 lies in a generally horizontal plane 30.

As will be appreciated from the description below, the body 11 of the apparatus 10 has a suspension whereby front and rear axles 46, 47 carrying the front and rear drive wheels 16, 17 are suspended from the body 11. The suspension arrangement allows the height of the body 11 to be raised and lowered relative to the front axle 46 independently of the rear axle 47, from a reference or datum position shown in FIG. 3, which is the ride height (suspension position) used for on-road higher speed travelling.

Figure 3:
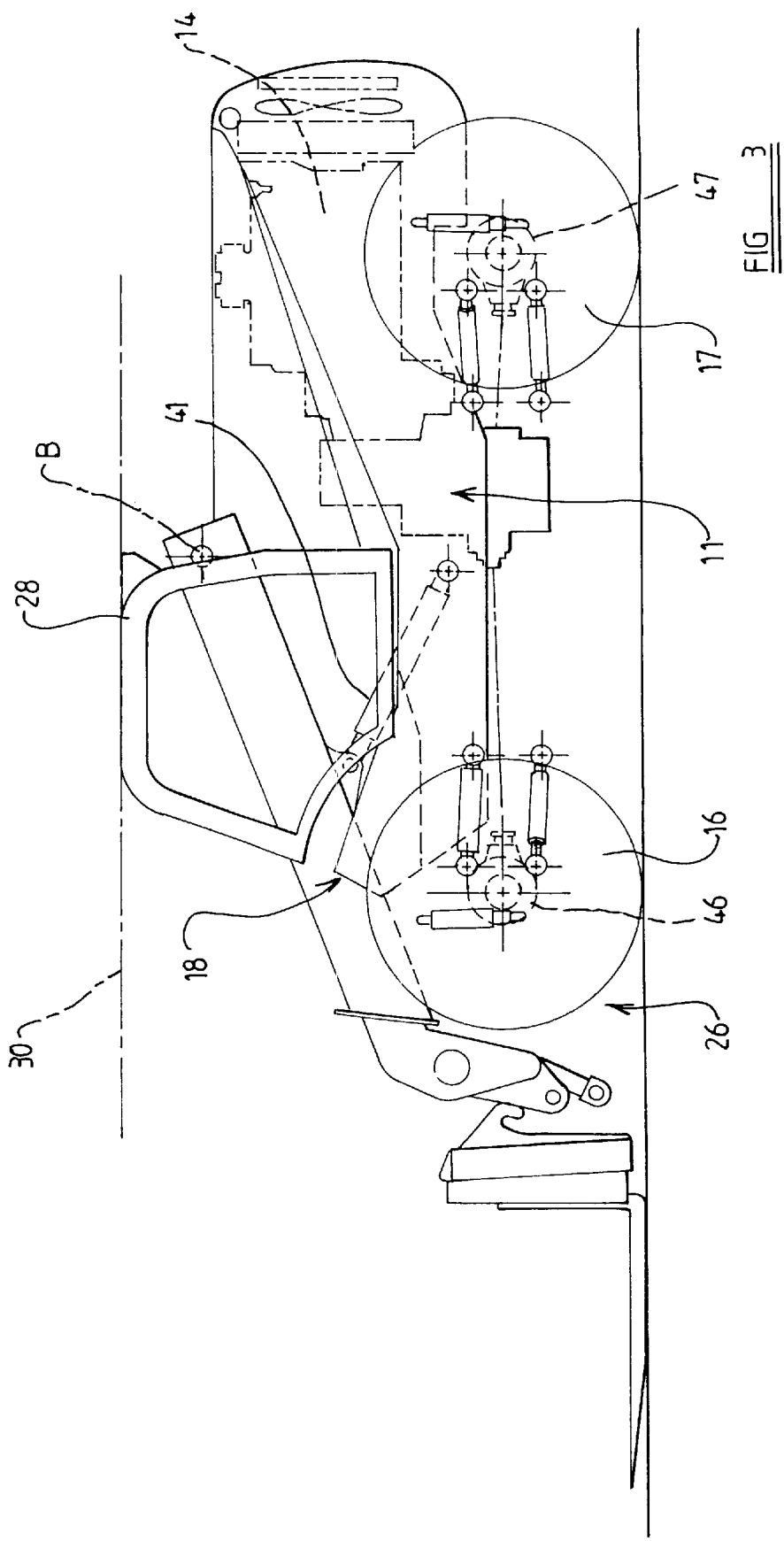
FIG. 3 is a similar view to FIGS. 1 and 2 but showing the body in a travel mode position between the fully lowered and fully raised positions.

In the datum position of FIG. 3, although overall, the height of the plane 30 above the ground is low, the plane 30 is still too high to enable the apparatus 10 to work within areas where the height is restricted to less than the height of plane 30.

Accordingly, as will be described below, to enable the apparatus 10 to work within such areas, the body 11 is lowereable relative to the front axle 46 to reduce the height of plane 30. Thus the apparatus 10 may be driven into height restricted areas, such as within a freight container 35 as shown in FIG. 1. The loader arm 18 is still able to be operated within a limited lifting range and so the apparatus 10 may be used for handling e.g. palletted loads 36 or other loads within the container 35.

However, to enable an operator within the cab 28 to have as clear a view as possible e.g. when operating the apparatus 10 with the loader arm 18 extended and elevated as seen in FIG. 2, e.g. to load or unload the palletted loads 36 onto the bed 37 of a lorry 39, the front of the body 11 may be raised relative to the front axle 46 towards a fully raised position as indicated in FIG. 2. Because the operator's cab 28 is located towards the front end 26 of the apparatus, adjustment of the height of the plane 30 in which the uppermost top part 34 of the cab 28 lies is maximized.

This provides a further advantage in that in the event that the apparatus 10 is required to be driven into and/or operated in water or the like, the front end 26 of the body 11 may be raised so that no or a minimal amount of the cab 28 will be submerged in the water. Thus by ensuring that water sensitive components such as electronic controls, instrumentation, radio and the like are at as high a possible position on the body 11 e.g. in the cab 28, these may be protected from water damage.

The loader arm 18 may be raised and lowered about axis B using conventional lifting and lowering technology. For example as shown, there is provided a lifting actuator 41 which may be actuated by hydraulic fluid provided by the hydraulic pump Pu, and the loading implement 21, or more importantly a load carried thereby, may be maintained in a substantially level orientation by fluid in a compensating actuator being exchanged with fluid of a tipping actuator (not shown) as the loader arm 18 is lifted and lowered.

Driving torque is transmitted from the engine 14 to the ground wheels 16, 17 by a transmission which includes a gearbox 25 which is mounted generally beneath the level of the loader arm axis B, generally centrally of the apparatus 10. The gearbox 25 includes a pair of output shafts S which are coupled via universal joints etc. to the respective front 46 and rear 47 axles on which the drive wheels 16, 17 respectively are mounted. The gearbox 25 may include means to enable drive to the front wheels 16 of axle 46 to be disconnected from the drive train whilst drive to the rear wheels 17 of axle 47 is maintained or vice versa, such disconnection means comprising a clutch or the like. Thus the apparatus 10 may be driven by two or four wheels as desired.

The apparatus 10 is capable of being steered either using the front wheels 16 alone, or in combination with the rear wheels 17. To achieve this each of the wheels 16,17 is mounted in a trunnion of the respective axles 46,47.

In the case of the front wheels 16, there is a mechanical connection between the front wheels 16 and the steering wheel in the cab 28 which may include telescopic arrangement to enable the mechanical connection to be maintained as the body 11 is raised and lowered. Otherwise movements of the steering wheel are transmitted to the front wheels 16 via a steering box and steering swivel. Mechanical front wheel 16 steering is power assisted.

In the case of the rear wheels 17, these are steered by means of a hydraulic actuator or actuators coupled to the rear wheels 17 via a relay lever system an example of which is described below with reference to FIG. 9. The servo assisting actuator 55 (FIG. 8) for the front wheels 16 may be coupled operationally to the rear wheel steer actuator 60 (FIG. 9). For example both may be contained within a common hydraulic circuit in which fluid expelled from the front wheel 16 steer assisting actuator 55 drives the rear wheel steer actuator 60 whereby the two actuators 55 and 60 operate in concert.

Figure 4:
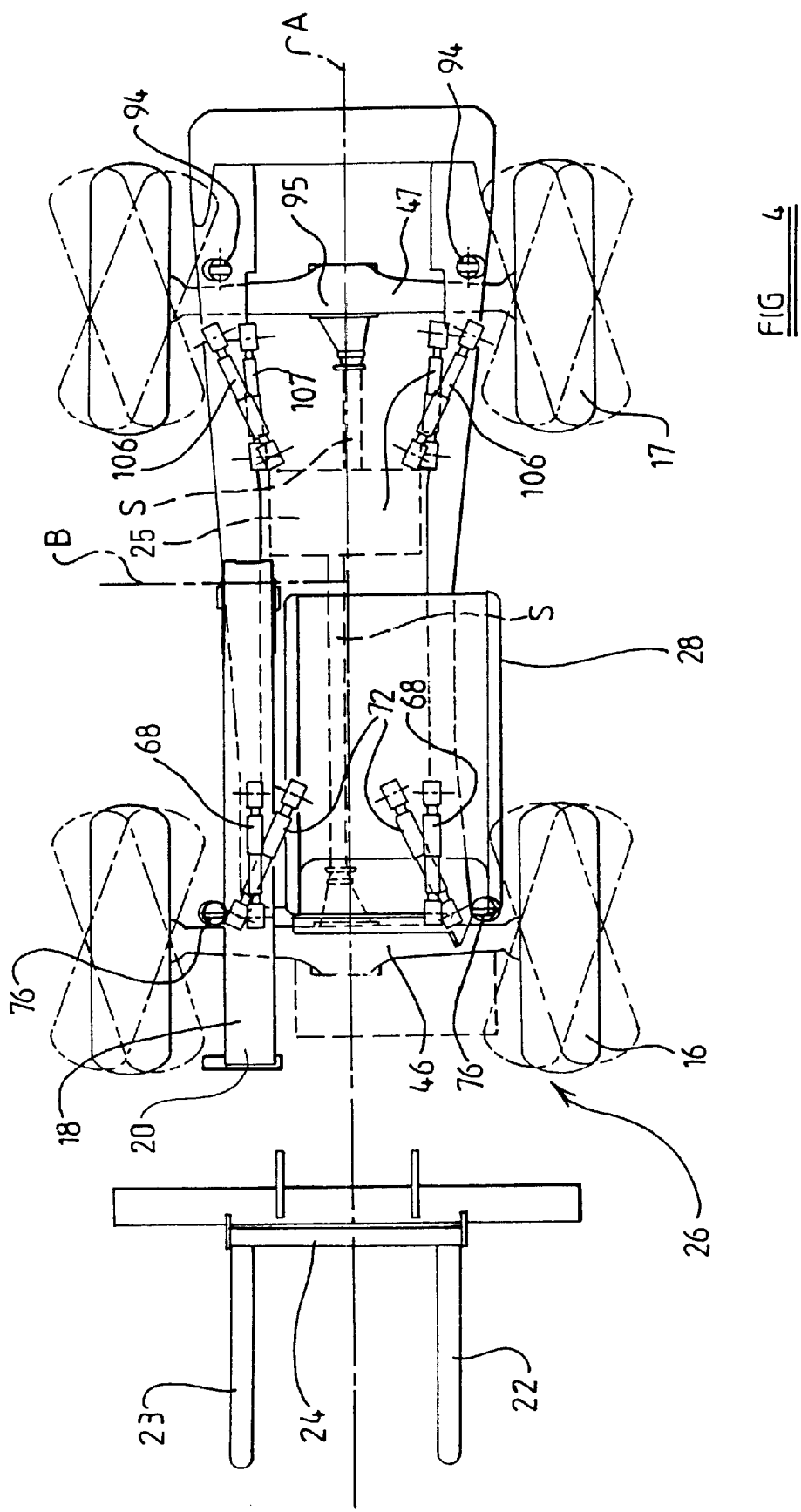
FIG. 4 is a plan view of the apparatus of FIGS. 1 and 2.
Figure 5:
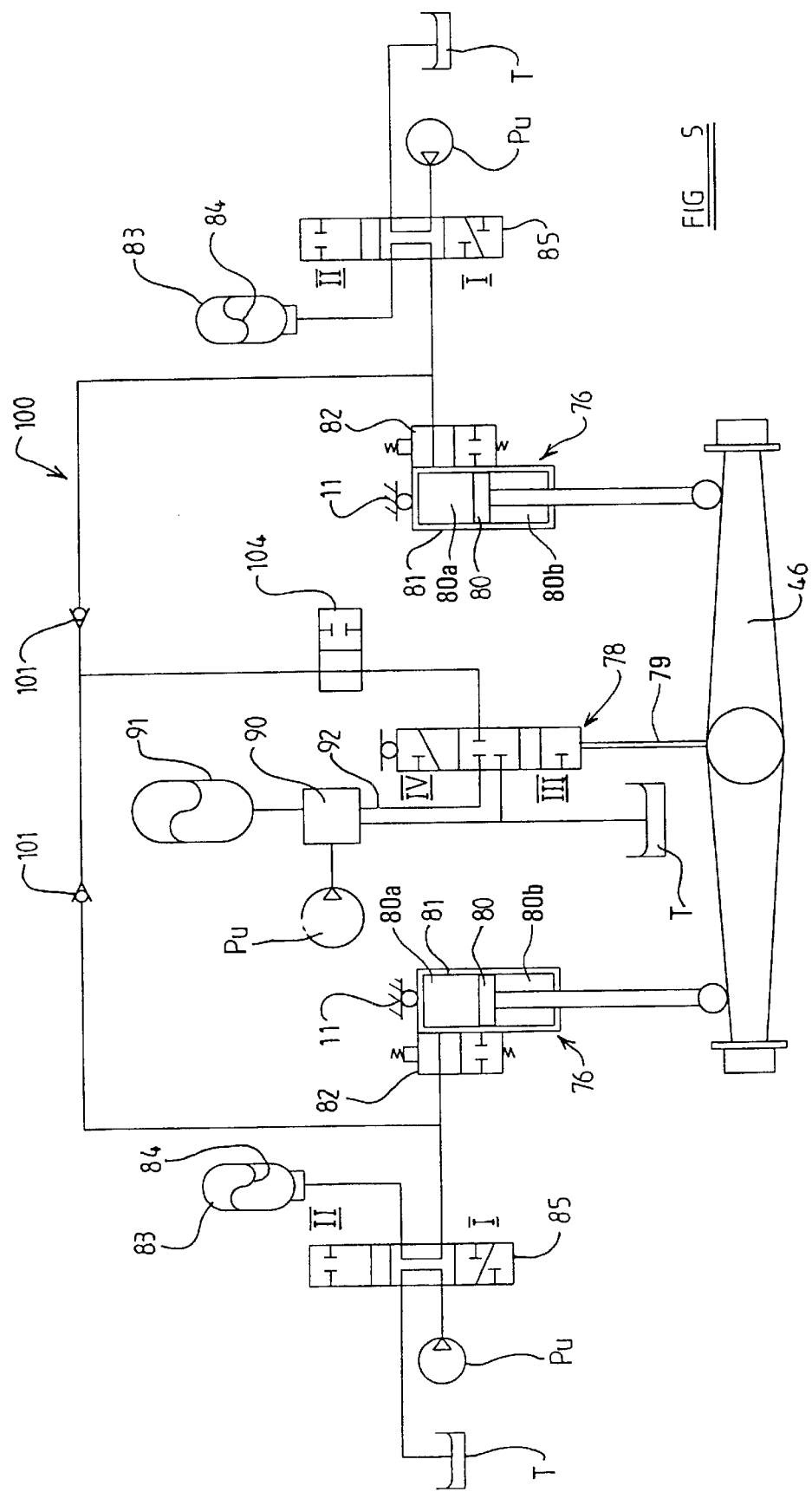
FIG. 5 is an diagrammatic view showing suspension components for the adjustable suspension of the front axle of the apparatus of the previous figures.

From FIG. 4 it may be appreciated that the front 16 and rear 17 wheels may be operated in so called crab mode in which the front 16 and rear 17 wheels are operated in unison and turn in the same direction, or alternatively so called cramp mode in which the front 16 and rear wheels 17 operate in unison but turn in opposite directions. Change over between four wheel steer in cramp and crab modes may be achieved by a hydraulic change-over valve, which may also alternatively enable the rear wheels 17 to be locked in a straight ahead set position so that two wheel steering using the front wheels 16 only may be performed e.g. for on-road use.

The hydraulic change-over valve may be controlled using an electronic control system which may incorporate proximity sensors or the like to determine at least when the rear wheels 17 are in their straight ahead positions.

The electronic control system may be adapted only to allow four wheel steering when the apparatus 10 is travelling over the ground below a predetermined set speed and may prevent change over between two and four wheel steering modes while the apparatus 10 is in motion.

Steering may otherwise be controlled as desired.

The engine 14 may include a cooling unit C mounted at the rear of the apparatus 10 which may be operative to cool the engine 14 and/or the hydraulic fluid used by the various actuators. Conveniently a fan F of the cooling unit C is hydraulically driven, and is disconnectable so that in the event that the apparatus 10 is driven in water up to the level of the fan F, power is not wasted driving the fan F.

It will be appreciated from FIG. 1 that maneuverability of the apparatus 10 within a freight container 35 is restricted. Often it will not be possible to handle palletted loads 36 at both sides of the container 35 by maneuvering the apparatus 10.

Thus the loading implement 21 i.e. the forks 22, 23, may be shiftable sideways on the carriage 24 relative to the loader arm 18 so that a first pallet 36 may be handled in one corner of the container 35 with the forks 22, 23 at one extreme of sideways movement and a second pallet 36 may be handled in an opposite corner of the container 35 with the forks 22, 23 in an opposite extreme of sideways movement.

Such carriage 24 sideways movement may be achieved by means of an linear hydraulic actuator, e.g. acting via a chain transmission, or a lead screw or other threaded member which is rotated.

Furthermore, for added maneuverability, where the loading implement 21 comprises a pair of forks 22, 23, the forks 22, 23 may be arranged to be movable transversely towards and away from one another on the carriage 24 to vary the spacing between them. This may most conveniently be achieved by means of a threaded member which is threaded oppositely along different regions thereof, with each of the forks 22, 23 having a female threaded part which traverses the threaded member in an opposite direction to the female threaded part of the other of the pair of forks 22, 23 as the threaded member is rotated e.g. by means of a motor or some other suitable electric, hydraulic or other motive means.

However adjustment of the spacing between the forks 22, 23 of the pair may otherwise be achieved as desired.

The front 46 and rear axles 47, both being driven axles, are suspended from the body 11 of the apparatus 10 by respective non-reactive suspensions by which we mean that there is no significant change in the vertical loading on the respective ground engaging wheels 16, 17 in response to changes in the driving torque applied thereto by the engine 14 via the transmission.

The suspension for the front axle 46 includes at each side of the apparatus 10, an upper leading link 68 which is pivotally connected at one end 69 at a first position to the front axle 46, and pivotally connected at an opposite end 71 to the body 11, and a lower leading link 72 which is connected at one end at a second position 73 to the front axle 46 and at an opposite end 74 to the body 11, the first positions 69 of the upper links 68 being above the level of the second positions 73 of the lower links 72, and the points of connection 71 of the upper links 68 to the body 11 being above the level of the points of connection 74 of the lower links 72 to the body 11.

The links 68, 72 of each pair may be parallel or not as necessary. If desired, particularly but not exclusively where the links 68, 72 are parallel, the front axle 46 may be further located by means of a Panhard rod Pa (see FIG. 8) which stabilizes the front axle 46, provides reaction to the steering mechanism and affects roll steer and bump steer characteristics.

Front axle 46 movement relative to the body 11 is damped by damping members 76 which in this example are hydraulic struts. Additionally, the hydraulic struts 76 may include mechanical damping elements such as mechanical springs and resilient end stops to enable the suspension to handle sudden and large axle 46 displacements as may occur when the apparatus 10 is travelling over very rough ground.

The struts 76 each have a piston 80 moveable in a cylinder 81 in response to relative axle 46/body 11 displacements. Hydraulic fluid may flow to and from the cylinders 81 in response to piston 80 movements. The hydraulic fluid from each strut 76 is transmitted via a solenoid operated cut-off valve 82, when open, to a gas spring 83. The gas spring 83 includes a diaphragm 84 behind which a volume of gas is trapped. Thus the gas springs 83 provide damping as hydraulic fluid is transmitted to and from the gas springs 83 from the struts 76.

It will be appreciated that by positively feeding hydraulic fluid to the cylinders 81 of the struts 76, the pistons 80 therein may be displaced outwardly so as to raise the body 11 relative to the front axle 46. Conversely, by relieving hydraulic fluid from the cylinders 81 of the struts 76, the body 11 may be lowered. Thus the height of the front end 26 of the body 11 may be adjusted as described above, between the fully lowered position of FIG. 1, the datum position shown in FIG. 3 and the fully raised position of FIG. 2.

To enable hydraulic fluid to be fed to the cylinders 81 of the struts 76, and to be relieved therefrom, each strut 76 has an associated suspension height control valve 85. When in the position shown in FIG. 5, the valve 85 simply connects the cylinders 81 to their respective gas springs 83. If it is desired to lower the body 11 relative to the front axle 46, the suspension height control valves 85 are moved to the positions indicated at I so that fluid may be relieved from each of the cylinders 81 of the struts 76 to tank T.

Conversely, when it is desired to raise the body 11 relative to the front axle 46, to the datum position or beyond towards fully raised position, the suspension height control valves 85 are moved to the positions indicated at II. In this position pressurized fluid from a pump Pu is provided for struts 76 to displace the piston 80 thereof outwardly, so as to raise the body 11 relative to the front axle 46.

In this example, a level sensing means is provided to enable the datum position to be set. The level sensing means includes a level sensing valve 78 which is mechanically (pivotally) coupled to the axle 46, in this example via a link 79 (FIG. 5) which extends towards a general mid point of the front axle 46. The level sensing valve 78 is shown in a position which will be adopted when the body 11 is at the datum position relative to the axle 46.

In the event that the body 11 is lowered relative to the axle 46 and it is desired to return the body 11 to the datum position, it will be appreciated that the level sensing valve 78 will adopt the position indicated at III. When in this position pressurized hydraulic fluid from pump Pu will be communicated via a pressure maintaining valve 90 and associated accumulator 91, via line 92 through the level sensing valve 78 and into the hydraulic circuit 100 in which the struts 76 are provided. Thus pressurized fluid may flow via respective one way valves 101 into the cylinders 81 of the struts 76 in addition to fluid from the control valves 85, to raise the body 11 relative the axle 46 until the level sensing valve 78 assumes the position shown in FIG. 5.

The body 11 may be lowered to the datum position by operating suspension height control valves 85 in position I.

The level sensing valve 78 thus senses the level of the body 11 relative to the axle 46, and the height of the body 11 when lower than the datum position is regulated via the flow of fluid into the hydraulic circuit part 100 in which the struts 76 are provided. The level sensing valve 78 is preferably operative at all times that the axle 46 is required to be suspended relative to the body 11. When the body 11 has been adjusted to a desired position relative to the axle 46 for working of the apparatus, the suspension may be locked out by operating solenoid operated cut-off valves 82 so that there is no flow of hydraulic fluid into or from the cylinders 81 of the struts 76, and a suspension mode valve 104 is moved to the alternative position to that indicated in FIG. 5, so that the load sensing valve 78 is inoperative.

It will be appreciated that if the suspension of the front axle 46 is operated when the apparatus 10 is performing a work operation, in either a raised or lowered position, the suspension provided by the links 68 and 72 and the struts 76 could lead to instability, particularly where heavy loads are handled.

The rear axle 47 is suspended from the body 11 by a similar non-reactive suspension arrangement to that employed for the front axle 46, although instead of a pair of leading suspension links 68, 72 at each side of the apparatus 10, a pair of upper links 106 and a pair of lower links 107 are provided. Each of the lower links 107 is pivotally connected at a first end 109, to the axle 47, and at a second end 110 to the body 11. Each of the upper links 106 is pivotally connected at a first end 112 to the axle 47, and is pivotally connected to the body 11 at a second end 113. The upper links 106 are in a generally "V" configuration.

Damping is again provided by hydraulic struts 94 and gas springs 116 and a level sensing means is provided at each axle 47 side to sense the displacement of the axle 47 relative to the body 11 at each side and to control the flow of hydraulic fluid to the struts 94 to control the degree of damping provided thereby depending on the extent of the axle 47 displacement.

The rear axle 47 suspension is not adjustable as is the front axle 46, thus providing a simplified arrangement which still allows body 11 height adjustments at the front 26 of the apparatus 10 between the fully lowered position of FIG. 1 and the fully raised position of FIG. 2. Moreover, because the height of the front 26 only of the body 11 is adjustable, there is no need to lift and lower the entire weight of the body 11, thus conserving energy and permitting body 11 height adjustments even when other hydraulic services are operated.

By virtue of the non-reactive suspension being provided for the front and rear axles 46, 47 all four ground wheels 16, 17 may be driven whereby the apparatus 10 is inherently better able to maneuver on rough terrain, and is able to travel at relatively fast speeds on smoother terrain, such as on-road.

For rough terrain use, the apparatus 10 will tend to be operated in four wheel drive mode, i.e. with driving torque being transmitted to all four wheels 16 17, and may be operated in two or four wheel steer mode as desired. For on-road use, the apparatus 10 will tend to be operated in two wheel steer mode and in two wheel drive mode.

Desirably, the suspension arrangement for the rear axle 47 is used to provide suspension for on road generally high speed travel.

Where rougher terrain is involved, or where it is desired to stabilize the axle 47, the rear axle 47 may be locked out. Although an arrangement in which the rear axle is made rigid relative to the body 11 may be employed, desirably, the rear axle 47 when locked out is permitted to oscillate relative to the body 11 in as much as a mid point 95 of the rear axle 47 will be restricted from moving towards and away from the body 11, and the axle 47 ends 47a, 47b will not be permitted to move independently relative to the body 11.

Figure 6:
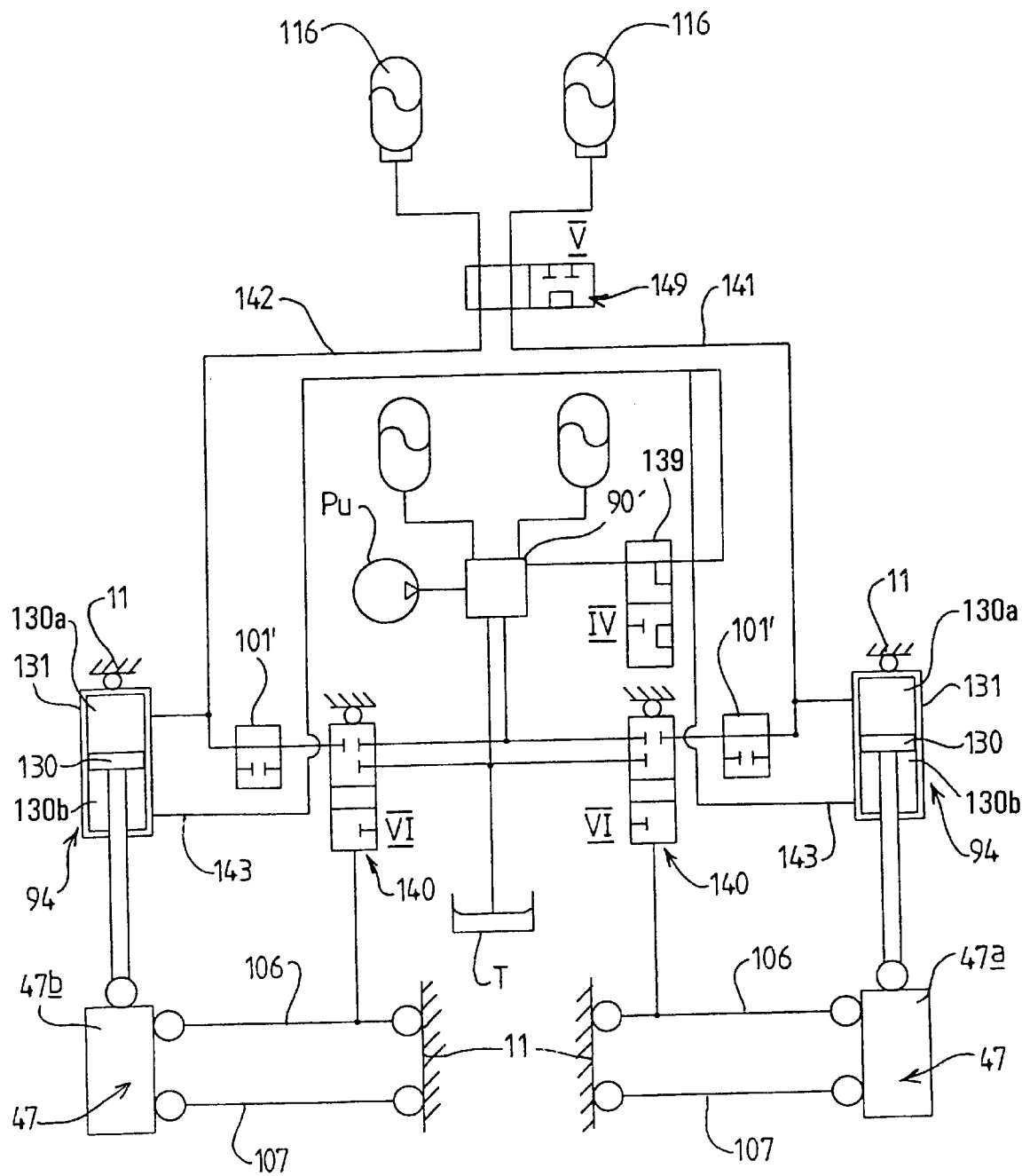
FIG. 6 is a diagrammatic view showing suspension components for the rear axle of the apparatus of FIGS. 1 to 4.

Referring to FIG. 6, the hydraulic struts 94 for the rear axle 47 each include a piston 130 and a cylinder 131 in which the piston 130 is moveable in response to axle 47 movements relative to the body.

The rear axle 47 suspension arrangement includes a lockout valve 149 to which hydraulic fluid from each of the cylinders 131 of the struts 94 may be communicated via respective lines 141 and 142.

With the valve 149 in the position shown in FIG. 6, the axle 47 is fully suspended in that piston 130 movements in the cylinders 131 result in hydraulic fluid being ejected from or drawn into the cylinders 131, and piston 130 movement in the cylinders 131 is damped individually via gas springs 116.

Where the lockout valve 149 is moved to position V shown in FIG. 6, the gas springs 116 will be isolated, and moreover, the hydraulic lines 141 and 142 which communicate with the respective cylinders 131 of the struts 94, will communicate. In this mode, the axle 47 is locked out in as much as a mid point 95 of the axle cannot move generally relative to the body 11. However the axle 47 may oscillate because in the event that the axle is raised at one side e.g. side 47a indicated in FIG. 6, hydraulic fluid ejected from the respective cylinder 131 will be communicated via line 141, valve 149, line 142, into the cylinder 131 at the second side 47b of the axle 47 to cause the second side 47b of the axle to move in an opposite direction to the upward movement of the first side 47a of the axle, and vice versa.

It can be seen that the struts 94 are double acting and that a line 143 extends between both rod sides 130b of the pistons 130 via an isolating valve 139. The valve 139 is moved to position IV when the axle 47 is in oscillating mode. Otherwise, in fully suspended mode, the valve 139 allows for fluid make up to the rod sides 130b of the struts 94, in the event of fluid loss in the system.

The rear axle suspension arrangement further includes level sensing valves 140 one associated with each side 47a and 47b of the axle. The level sensing valves 140 may sense the position of the respective side 47a, 47b of the axle directly, or may sense the position of the upper 106 or lower 107 links.

When the level sensing valves 140 are in the positions shown in FIG. 6, the rear axle 47 suspension arrangement operates exactly as described above. When the system is in the suspended mode the position of the isolating valve 149 is as shown.

When one or other of the level sensing valves 140 moves to the position indicated at VI which would indicate that the axle side 47a or 47b has moved towards the body 11, e.g. as a result of a loss of hydraulic fluid in the circuit, hydraulic fluid under pressure from the pump Pu may flow through a pressure maintaining valve 90' into line 141 or 142 via a lock-out valve 101' to urge the respective piston 130 outwardly of its cylinder 131 in an effort to return the body 11/axle end 47a, 47b distance to the datum position.

When the axle 47 is locked out in oscillating mode, with the valve 149 in position V, the lock-out valves 101' will be closed so that the level sensing means is inoperative, and the isolating valve 139 will be moved to position IV so that there is no path for fluid from the pressure maintaining valve 90' to the struts 94.

It will be appreciated that when the suspension of the rear axle 47 is not locked out, the hardness of the suspension may be adjusted to suit different conditions by allowing only a restricted flow of fluid to and from the struts 94, and even when the suspension is locked out to allow oscillation only of the axle 47, the degree of damping of the axle 47 may be adjusted by restricting the flow of hydraulic fluid between the struts 94.

By virtue of the combination of the ability of the apparatus 10 to be operated selectively in each of these driving modes, and the provision of a body 11 which can be raised and lowered relative to an axle 46 at one end 26 of the body 11 and locked at a desired height relative to the axle 46, the provision of a loading implement comprising loading forks 22, 23 arranged so that the spacing between the loading forks 22, 23 as well as their transverse position on the loader arm 18, can be adjusted, a load handling apparatus 10 of great versatility may be provided.

Figure 7:
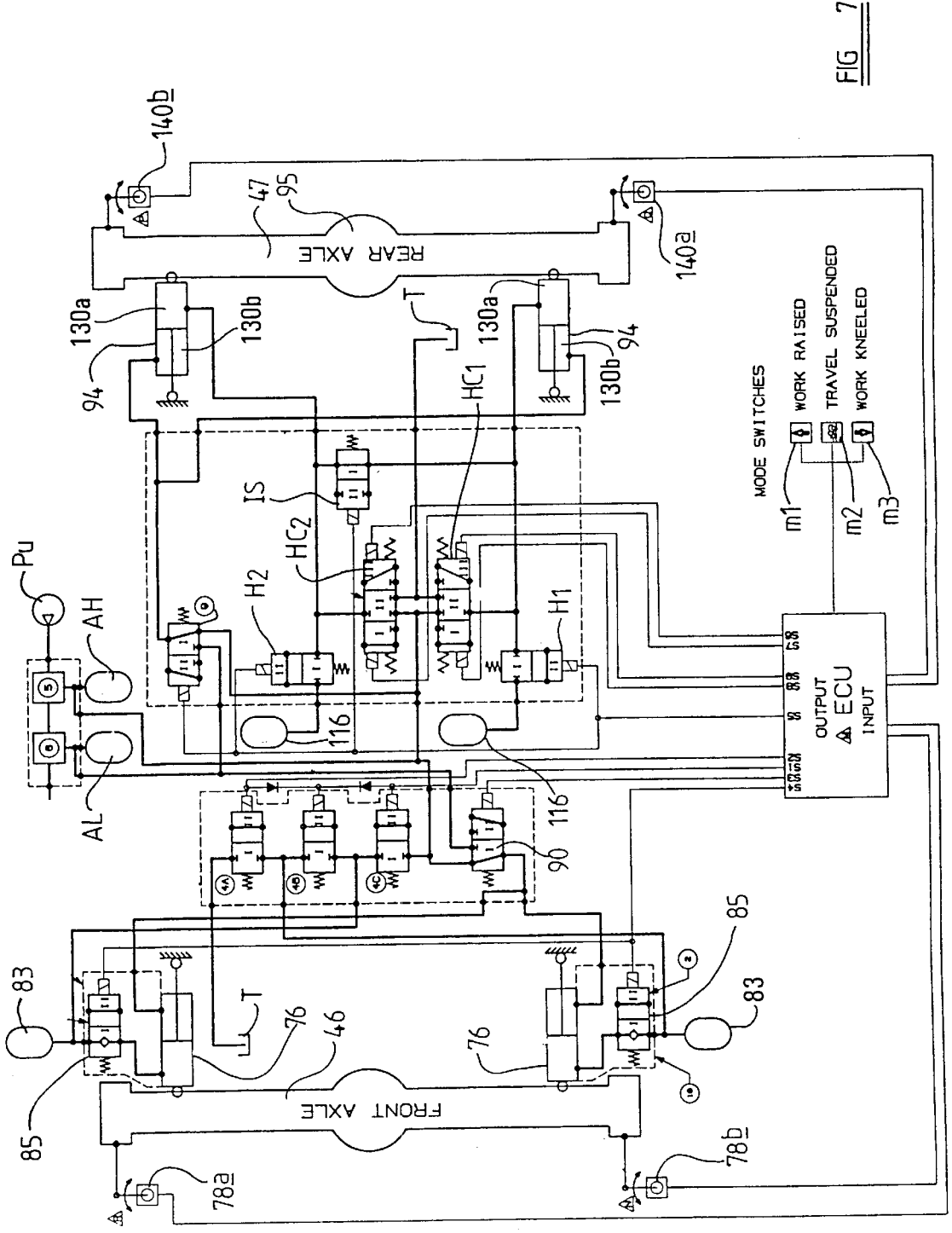
FIG. 7 is a diagram of components of an alternative front and rear suspension arrangement.

Referring to FIG. 7, there is shown an alternative hydraulic circuit arrangement to that described above with reference to FIGS. 5 and 6, in which the front and rear suspension control arrangements are integrated.

In FIG. 7, similar parts to those indicated in the preceding figures are labelled with the same reference numerals. It can be seen that in the FIG. 7 arrangement, instead of providing for the front axle 46 a single height sensor like valve 78 in FIG. 5, a pair of height sensors 78a and 78b are provided. Control of various electrically operated valves is via an electronic processing unit shown at ECU, in response to control switches m1, m2, m3 which would be located within the reach of an operator within cab 28 (FIG. 1). Other differences will become apparent from the ensuing description which will describe operation of the hydraulic system primarily with reference to alternative operating modes of the working apparatus 10.

When it is desired to drive the apparatus in so called travel mode, e.g. on a road surface, in which both the front and rear suspensions are operative to enable such travel at high road speeds, switch m2 is closed. The height of the front axle 46 relative to the body 11 of the apparatus 10 is sensed at each axle 46 side by the height sensors 78a and 78b. The ECU will calculate a mean sensed ride height from the inputs from the sensors 78a, 78b and compare these to a desired ride height. In the event of any discrepancy between mean sensed actual and desired ride heights, the ECU will apply correction as described below to both axle sides simultaneously.

In travel mode, valves 85 will be moved to state II and thus the gas reservoirs 83 will communicate with the struts 76 to effect suspension, and to allow communication between the front struts 76 and height control valves 4A, 4B, 4C which may perform ride height corrections when required.

An accumulator valve 90 is energized in state II by the ECU, so that the rod sides 80b of the front struts 76 are kept filled up with hydraulic fluid from a low pressure accumulator AL, to prevent cavitation and enable lubrication, and while the sensed mean ride height and desired ride height are determined by the ECU to conform, the valves 4A, 4B and 4C will be maintained in state I, in which fluid flow therethrough is blocked.

In the event that a discrepancy is determined between desired ride height and mean sensed ride height, the ECU will determine from the direction, magnitude and duration of the error, whether this is due to reactions of the suspension to irregularities in the road or other terrain surface, in which case corrective action may not be taken, or due to for examples leakage of hydraulic fluid from the struts 76, or increased axle weight e.g. due to changing load.

If the front struts 76 are shortened, the ECU changes the operating state of height control valves 4B and 4C to state II. In this case, fluid from a high pressure accumulator AH is admitted to the rod sides 80b of front struts 76 for a calculated duration depending on the extent of ride height error determined. Then height control valves 4B and 4C are returned to state I.

If the front struts 76 are lengthened, height control valves 4A and 4B are moved to state II for a specific duration, again calculated, so that a predetermined amount of fluid is permitted to flow to tank T.

Ride height for the rear axle 47 is sensed in a similar manner to that of the front axle 46, but with rear axle height sensors 140a and 140b. However the axle 47 height at each side of the apparatus 10 is compared individually by the ECU with a desired value and corrective action is taken for each axle 47 side rather than for the axle 47 as a whole, as with the front axle 46.

When there are no discrepancies between sensed and desired ride heights, an accumulator valve 9 is energized in state II, and the rod sides 130b of the rear struts 94 are connected with the low pressure accumulator AL. Individual isolation valves H1 and H2 are both in state II also, so that the piston sides 130a of the rear struts 94 are connected to their respective gas springs 116. Height control valves HC1 and HC2 are in default state II, so that fluid flow therethrough is blocked.

A strut interconnection valve IS is in state II to prevent crossover fluid flow between the piston sides 130a of the struts 94.

If an increase in ride height is sensed by sensor 140a for example at the left hand side of the apparatus 10, height control valve HC1 is moved for a calculated duration to state III, and fluid will be released from piston side 130a of the left hand strut 94 to tank T. If a decrease in ride height is determined, height control valve HC1 will be moved to state I so that fluid from the high pressure accumulator AH can flow into the piston side 130a of the left hand strut 94.

At the right hand side, the axle 47 ride height will similarly be controlled, but corrections are obtained by moving height control valve HC2 between positions I, II and III.

The ECU is arranged to respond to sensed height ride changes intelligently, and typically after a delay, so as to avoid unnecessary and overly frequent ride height adjustments e.g. in response to terrain irregularities.

To change operating mode from travel mode to a working mode in which the front suspension is lowered, switch m2 is opened, and switch m3 is closed.

The ECU responds by switching front height control valves 4A and 4B to state II, to allow fluid to escape from the gas springs 83 back to tank T; accumulator valve 90 is moved, or allowed to move under spring to state I such that the rod sides 80b of struts 76 are connected to the high pressure accumulator AH forcing the strut lengths to be reduced to a minimum length, even in the event that the apparatus 10 is on uneven ground and the front axle 46 is not level; valves 85 will remain in state II. Thus the front axle 46 is held rigid relative to the body 11 of the apparatus 10 during working.

At the rear, accumulator valve 9 moves to its default position I and connects the rod sides 130b of the rear struts 94 to the height pressure accumulator All; isolation valves H1 and H2 move to their default positions Ito isolate the rear struts 94 from their gas springs 116, and strut interconnection valve IS moves to state Ito connect the piston sides 130a of the rear struts 94 together.

Thus the rear axle 47 has no suspension, but may oscillate about longitudinal axis A of the apparatus 10 with fluid displaced from one of the struts 94 in response to irregularities in terrain, being fed to the other strut 94. In this mode the rear axle 47 behaves very similarly to a conventional oscillating axle arrangement.

Ride height for the rear axle 47 is maintained during operation of the apparatus in lowered (and raised) working modes. This is achieved by the ride height sensors 140a, 140b continuing to provide inputs to the ECU.

If the ride height sensed is too low, either one of the height control valves HC1 and HC2 may be moved to state I for a short duration to connect the piston sides 130a of both of the rear struts 94 to the high pressure accumulator AH. If the ride height is too high, either one of the height control valves HC1 and HC2 may be moved to state III for a short duration to connect the piston sides 130a of both of the rear struts 94 to tank T.

Where it is desired to operate the apparatus 10 again in travel mode, the various valves will be returned to their states described above in relation to travel mode. The height sensors 78a and 78b will detect that the ride height is too low, and the operating states of height control valves 4B and 4C will thus be changed to state II to allow fluid from the high pressure accumulator AH to be admitted to the rod sides 80b of front struts 76 until the desired ride height is reached. Then height control valves 4B and 4C are returned to state I.

To operate the apparatus 10 in a working mode in which the front suspension is raised, mode switch m1 is closed (with m2 and m3 open). The ECU will respond by operating the various valves for the rear axle 47 suspension to allow only oscillating rear axle 47 movement as described above for reduced height front suspension working mode.

Otherwise for the front axle 46, control valves 85 are moved or allowed to move to (default) state I so that a check valve thereof will prevent fluid passing from the piston sides of the front struts 76, to guard against strut collapse in the event of system failure; height control valves 4B and 4C are both switched to state II to allow fluid from the high pressure accumulator AH into the piston sides of struts 76 so that the strut 76 lengths are increased to a desired height. When a desired height is reached, height control valves 4B and 4C may retained in state II, to make up any fluid loss e.g. from struts 76, by allowing feeding of more fluid across the check valves of control valves 85 (the check valves of control valves 85 are shown in state I).

Thus in both raised and lowered working height conditions, the front axle 46 is held rigid relative to the body 11 of the apparatus 10.

To return from raised height working mode to travel mode, the various valves are returned the positions described above for travel mode. The ride height sensors 78a, 78b of the front axle 46, at least will determine a discrepancy between mean sensed ride height and travel mode desirable ride height, and as a result, height control valves 4A and 4B will be moved to state II to allow fluid to pass from the piston sides 80a of the struts 76 to tank T, until a desired ride height is reached.

By suitably programming the ECU, the apparatus 10 may be changed directly between front suspension lowered to front suspension raised working modes and vice versa, without having to select travel mode therebetween.

With the hydraulic system functionality shown in FIG. 7, in the event of catastrophic hydraulic failure of the suspension system, the various valves will all return to their default states described and shown, which would enable the apparatus 10 still to mobilized but without ride height corrections being made, or changes between suspension modes being able to be made.

The ECU will require calibration. Preferably this is a function which may be performed by an operator of the apparatus 10, e.g. from a control panel within the operator's cab, although this may be a factory only or specialist service feature only, if desired. The ECU may be programmed to complete one ride height event before initiating another ride height event. Override means may be provided to prevent changes in suspension modes being effected unless the apparatus is stationary.

Figure 8:
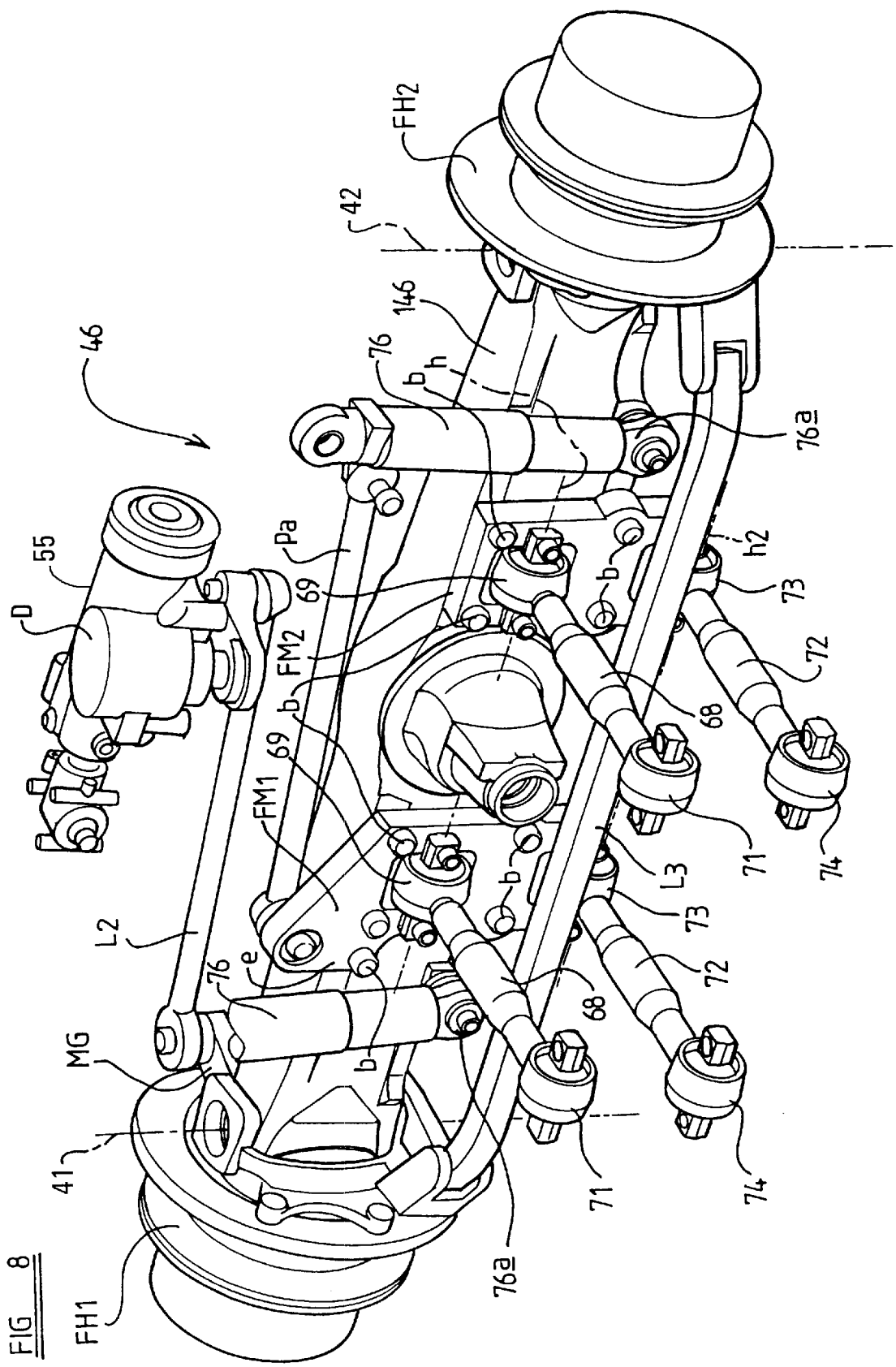
FIG. 8 is a more detailed but illustrative view of a front axle of the working apparatus.
Figure 9:
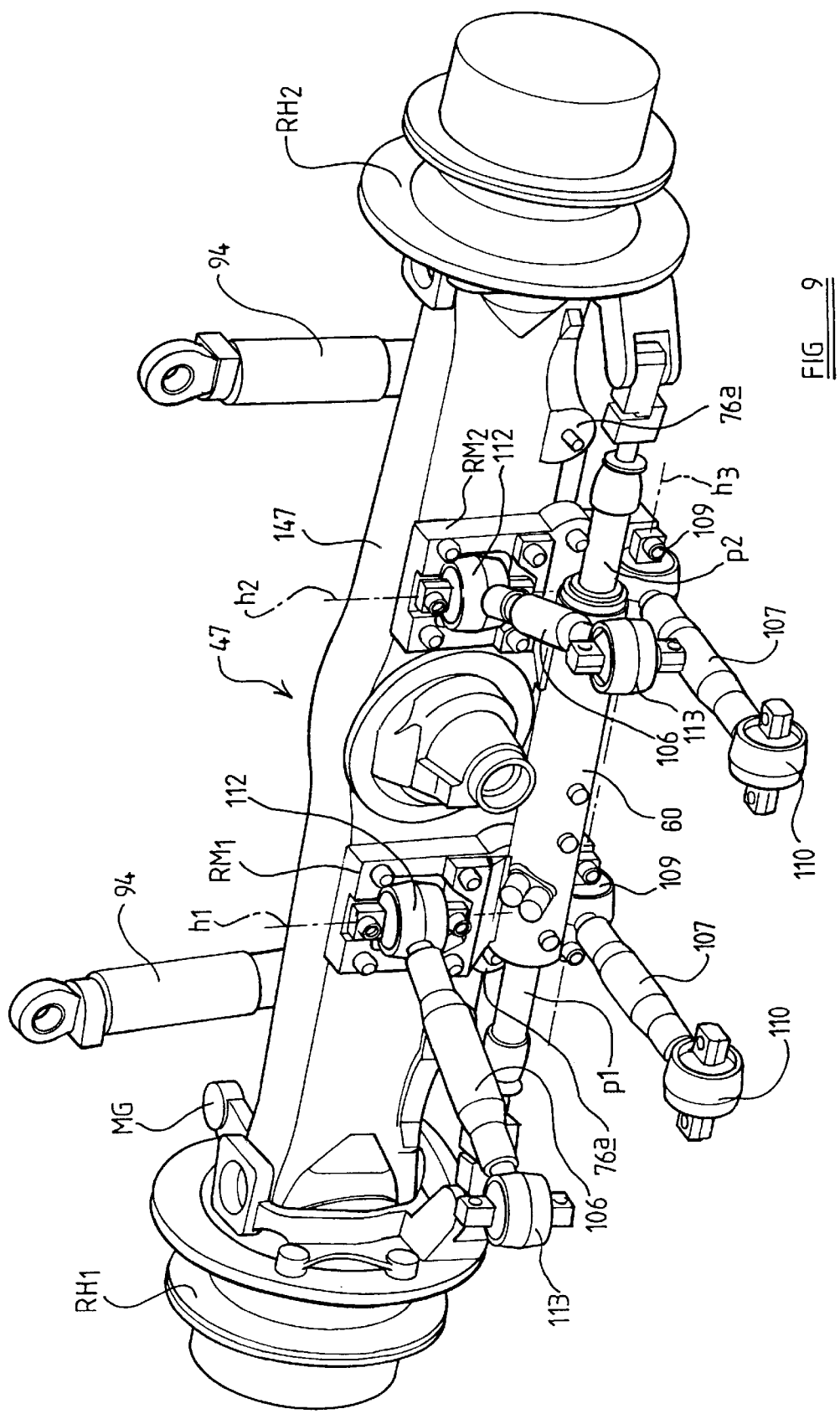
FIG. 9 is a more detailed but illustrative view of a rear axle of the working apparatus.

Referring now to FIGS. 8 and 9 in accordance with the invention, the front and rear axles 46, 47 may each include a main body part 146, 147 respectively. In the case of the front axle 46, the respective upper 68 and lower 72 suspension links are mounted at their one ends 69, 73 to the main axle body part 146, via mounting plates FM1 and FM2, being one mounting plate FM1/FM2 at either side of a mid point of the axle 46 where transmission shaft S (not seen in FIG. 8 but visible in FIGS. 1 and 4) may be connected.

The mounting plates FM1, FM2 are each secured to the main body part 146 of the axle 46 via fasteners such as bolts b which are received by formations, being threaded openings in the main body part 146.

It will be appreciated that the configurations of the mounting plates FM1 and FM2 are different in that one of the mounting plates, FM1 has an extension e, for connection of one end a Panhard rod Pa to the front axle 46, to provide lateral stabilization in the suspension system. The other end of the Panhard rod Pa is connected to the body 11 of the working apparatus 10.

Otherwise, the mounting plates FM1 and FM2 are both adapted to enable the suspension links 68 and 72 to be connected to the axle 46 such that the connection allows the suspension links to pivot relative to the main axle part 146.

Other features of the front axle 46 are as follows.

The main body part 146 is substantially symmetrical about a longitudinal axis of the axle 46. The axle 46 has at each opposite end, hubs FH1, FH2 to carry the front wheels 16 of the apparatus 10. The hubs FH1 and FH2 are pivotable about respective upright axes 41, 42 to effect steering of the apparatus 10, in this example via a mechanical steering box D to which a linkage (not seen) from a steering wheel within the operator's cab 28 may extend, the steering box D being connected via a further steering link L2 to one hub FH1, with the hubs FH1 and FH2 being interconnected with a yet further steering link L3 so as to move in concert in response to steering wheel movements. The mechanical steering is preferably servo-assisted.

It can be seen from FIG. 8 that struts 76 are attached to the front axle 46 outwardly of the mounting plates FM1, FM2 and on the same side of the main body part 146 to that of the links 68, 72. Thus the main body part 146 is provided with mountings 76a for the struts 76.

Referring to FIG. 9, the rear axle 47 is of similar construction to that of the front axle 46 but the struts 94 are attached to mountings provided on main axle part 147. The suitable mountings are similar to the mounting 76a shown, although the mountings are provided on the side of the main axle part 147 that is opposite to the rear suspension links 106, 107.

Otherwise, the rear suspension links 106, 107 are mounted on the main body part 147 via a pair of mounting plates RM1, RM2 which are configured appropriately different from the front axle mounting plates FM1, FM2 to mount the rear suspension struts 106, 107.

However it will be appreciated that the front and rear main axle parts 146, 147 are otherwise substantially common in configuration such that commonly configured components may be used with appropriately different mounting plates.

It is envisaged that a variety of axles having common main axle parts 146/147 may be provided to suit a range of different kinds and sizes of working apparatus, thus reducing design and manufacturing costs, because an entirely different axle would not be required for each different kind or size of apparatus. In each case, mounting plates would have to be designed and manufactured which may be different for each axle, appropriately to mount suspension links, or even dampers struts or any other suspension components on the main axle part.

Referring again to FIG. 9, hubs RH1 and RH2 are pivotally mounted on the main axle part 147 for carrying the rear wheels 17 of the apparatus 10, and power steered by an actuator AT which extends between the hubs RH1 and RH2. In this example, the front and rear hubs FH1, FH2 and RH1, RH2 are of common configurations such that piston parts p1 and p2 may be attached to the rear hubs RH1, RH2 at the same positions that the steering linkage L3 is attached to the front hubs FM1, FM2. In the case of the rear axle 47, the mounting MG of the one hub FH1 to which the second steering link L2 is connected in the case of the front axle 46, is redundant.

Whereas the mounting plates FM1 and FM2 for the upper links 68 of the front axle suspension, allow the upper links 68 to pivot relative to the main axle part 46 about a generally horizontal axis h, in the case of the rear axle 47, the mounting plates RM1, RM2 allow the upper steering links 106 to pivot relative to the main axle part 147 about respective generally upright axes h1 and h2, although the lower front and rear axle links 72, 107 are all allowed to pivot about respective generally horizontal axes h3. It can be appreciated that a wide variety of suspension arrangements can be provided for, by providing appropriately configured mounting plates. Of course where appropriate, instead of providing mounting plates, mounting members of other configuration may be provided. Also, in the example shown the formations by means of which the mounting plates FM1, FM2, RM1, RM2 are secured to the main axle parts 146, 147 have been described as openings to receive fasteners, other kinds of formations may be provided to enable connection of mounting plates or other members to the main axle parts 146, 147.

Various other modifications may be made without departing from the scope of the invention.

For example, although the cab 28 is shown at a front end 26 of the body 11 of the apparatus 10, the cab 28 may be provided more rearwards and may be provided more centrally than the position shown. In this case, it may be desirable for the front 46 and rear axle 47 suspension arrangements described above to be reversed, so as to achieve maximum variation of the height of the plane P in which the top part 34 of the cab 28 lies.

The engine 14 may be mounted more centrally of the apparatus 10 e.g. side mounted and may be provided in a lower position than shown.

In another arrangement which is not intended for on-road use and thus need not comply with the appropriate legislation, front wheel 16 steering may be effected solely by hydraulic means such as described for the rear wheels 17, or otherwise. Alternatively the apparatus 10 may be adapted for rear wheel 17 steering on the road so that a mechanical steering connection required to comply with highway legislation, may be to the rear wheels 17 rather than the front wheels 16.

Although the invention has been described with particular reference to a wheeled apparatus having front 16 and rear wheels 17, the invention may be applied to a load handling apparatus comprising half or full tracks although such apparatus may not be as able as a fully wheeled vehicle to travel at relatively fast speed e.g. on the road.

Although the invention has been described particularly in relation to a working apparatus being a loading apparatus 10, the invention may be applied to any other kind of working apparatus such as for examples only, excavating or combined excavating/loading apparatus which may have an excavating arm rather than or in addition to a loading arm 18, or even to a tractor or other agricultural vehicle where it is desirable to be able to lower one end of a body thereof relative to an axle thereof and thus the height overall.

What is claimed is:

1. A working apparatus including a body, a power operated motive means, a front axle and a rear axle, the axles each carrying ground engaging means on which the apparatus may move over the ground, the apparatus further including an operator's cab mounted on the body, and there being at least one working arm supported at or adjacent one end on the body at a position for movement relative to the body, the arm being adapted to carry a working implement at or adjacent a second end thereof, and wherein one of the front and rear axles is suspended from the body by suspension means which is adjustable independently of the other of the axles to raise the body relative to the one of the front and rear axles only to a fully raised position in which a plane in which an uppermost part of the body lies, is at a maximum height above the ground and a fully lowered position in which the plane is at a minimum height above the ground, the adjustable suspension means lockable when the body is in at least one of the fully raised and fully lowered positions such that the suspension means permits no or substantially no movement of the body relative to the locked axle, and further wherein the suspension means includes hydraulic suspension struts, each strut having a cylinder and a piston movable in the cylinder when the suspended axle moves relative to the body in response to irregularities in the ground as the apparatus moves over the ground, such piston movements resulting in hydraulic fluid flowing into or out of the cylinder to a gas spring, and the suspension means being lockable by means which prevent the flow of fluid into or out of the cylinder.

2. An apparatus according to claim 1 wherein the suspension means is lockable in a position between the fully raised and fully lowered positions.

3. An apparatus according to claim 1 wherein a level sensing means is provided for at least one of the axles, the level sensing means arranged to sense changes in the distance between the axle and the body, and including a height regulating means associated with the level sensing means and which is responsive to the level sensing means to adjust the distance between the axle and the body.

4. An apparatus according to claim 1 wherein the operator's cab is provided at or adjacent a front end of the body and the front axle is suspended by the suspension means such that the height of the cab is varied as the body is raised and lowered.

5. An apparatus according to claim 1 wherein an end of the working arm is supported on the body at a position located above the level of the ground engaging means but below the plane containing the uppermost part of the body.

6. An apparatus according claim 1 wherein the working arm extends forwardly of the operator's cab and is moveable relative to the body about a generally horizontal axis which is located rearwardly of the operator's cab.

7. An apparatus according to claim 1 wherein the working arm is a loader arm which is adapted to carry a loading implement, the loader arm being mounted adjacent one side of the body and the operator's cab being located generally at an opposite side of the body.

8. A working apparatus including a body, a power operated motive means, a front axle and a rear axle, the axles each carrying ground engaging means on which the apparatus may move over the ground, the apparatus further including an operator's cab mounted on a body, and there being at least one working arm supported at or adjacent one end on the body at a position for movement relative to the body, the arm being adapted to carry a working implement at or adjacent a second end thereof, and wherein one of the front and rear axles is suspended from the body by suspension means which is adjustable independently of the other of the axles to raise the body relative to the one of the front and rear axles only to a fully raised position in which a plane in which an uppermost part of the body lies, is at a maximum height above the ground and a fully lowered position in which the plane is at a minimum height above the ground, and wherein the suspension means includes a pair of links at either side of the body, one link of each pair being above the other relative to the ground, the upper link of each pair being pivotally connected at a first end relative to the body and at a second end to the axle at a first position and the lower link of each pair being pivotally connected at a first end relative to the body and at a second end to the axle at a second position, the second positions each being below their respective first positions.

9. An apparatus according to claim 8 wherein the suspended front or rear axle in use transmits driving torque to the ground via the ground engaging means thereof, the suspension being a non-reactive suspension in which there is substantially no change in the vertical loading on the ground engaging means in response to changes in the driving torque applied thereto.

10. An apparatus according to claim 8 wherein the front axle is steerable.

11. An apparatus according to claim 8 wherein the rear axle is steerable.

12. An apparatus according to claim 8 wherein the front and rear axles are steerable and steering lock means are provided to lock one of the front and rear axles in a set position.

13. A working apparatus including a body, a power operated motive means, a front axle and a rear axle, the axles each carrying ground engaging means on which the apparatus may move over the ground, the apparatus further including an operator's cab mounted on the body, and there being at least one working arm supported at or adjacent one end on the body at a position for movement relative to the body, the arm being adapted to carry a working implement at or adjacent a second end thereof, and wherein one of the front and rear axles is suspended from the body by suspension means which is adjustable independently of the other of the axles to raise the body relative to the one of the front and rear axles only to a fully raised position in which a plane in which an uppermost part of the body lies, is at a maximum height above the ground and a fully lowered position in which the plane is at a minimum height above the ground, wherein the other of the front and rear axles is also suspended from the body but the adjustable suspension is adjustable independently of the suspension of the other axle, and wherein the suspension means suspending the other of the front and rear axles includes a pair of links at either side of the body, one link of each pair being above the other relative to the ground, the upper link of each pair being pivotally connected at a first end relative to the body and at a second end to the axle at a first position and the lower link of each pair being pivotally connected at a first end relative to the body and at a second end to the axle at a second position.

14. A working apparatus including a body, a front axle and a rear axle, each axle carrying a pair of ground engaging means, one at or towards each end of the axle, front axle mounting means mounting the front axle relative to the body, and rear axle mounting means mounting the rear axle relative to the body, the working machine being operable in at least two operating modes in each of which the machine may move over the ground namely a first mode in which the front and rear axles are suspended from the body by their respective mountings such that the front and the rear axles are movable relative to the body in response to irregularities in terrain, and a second mode in which one of the front and rear axles is suspended from the body by the respective axle mounting means whilst the other of the axles is constrained to oscillate about a longitudinal axis which is substantially fixed relative to the body in response to irregularities in terrain.

15. A working apparatus including a body, a front axle and a rear axle, each axle carrying a pair of ground engaging means, one at or towards each end of the axle, front axle mounting means mounting the front axle relative to the body, and rear axle mounting means mounting the rear axle relative to the body, the working machine being operable in at least two operating modes in each of which the machine may move over the ground namely a first mode in which the front and rear axles are suspended from the body by their respective mountings such that the front and the rear axles are movable relative to the body in response to irregularities in terrain, and a second mode in which one of the front and rear axles is held generally rigid relative to the body by the respective axle mounting means whilst the other of the axles is constrained to oscillate about a longitudinal axis which is substantially fixed relative to the body in response to irregularities in terrain.

16. A working machine including a body, a front axle and a rear axle, each axle carrying a pair of ground engaging means, one at or towards each end of the axle, front axle mounting means mounting the front axle relative to the body, and rear axle mounting means mounting the rear axle relative to the body, the working machine being operable in three alternative operating modes in each of which the machine may move over the ground namely a first mode in which the front and rear axles are suspended from the body by their respective mountings such that the front and the rear axles are movable relative to the body in response to irregularities in terrain, a second mode in which one of the front and rear axles is suspended from the body by the respective axle mounting means whilst the other of the axles is constrained to oscillate relative to about a longitudinal axis which is substantially fixed relative to the body in response to irregularities in terrain and a third mode in which one of the front and rear axles is held generally rigid relative to the body by the respective axle mounting means whilst the other of the axles is constrained to oscillate about a longitudinal axis which is substantially fixed relative to the body in response to irregularities in terrain.

17. A method of operating a working apparatus which includes a body, a power operated motive means, a front axle and a rear axle, the axles each carrying ground engaging means on which the apparatus may move over the ground, the apparatus further including an operator's cab mounted on the body, and there being at least one working arm supported at or adjacent one end on the body, the working arm being moveable relative to the body and being adapted to carry a working implement at or adjacent a second end thereof, and wherein at least one of the front and rear axles is suspended from the body by suspension means, the method including adjusting one only of the front and rear suspension means, to move the body relative to the ground between a fully raised position in which a plane in which an uppermost part of the body lies is at a maximum height above the ground and a fully lowered position in which the plane is at a minimum height above the ground, the body further defining an access plane and wherein the body is moved to a fully lowered position and the apparatus is moved on the ground engaging propulsion means into a position where the access plane is disposed lower relative to a position of the access plane prior to the body being moved into the fully lowered position, and further wherein for higher speed travel the suspension means is adjusted to move the body to a position between the fully raised and fully lowered positions, and for performing working operations the suspension is fully raised or lowered.

18. A method according to claim 17 wherein for working operations, the adjustable suspension means is locked so that there is no or substantially no movement of the body permitted relative to the locked axle, by the suspension means.

19. A method of operating a working apparatus which includes a body, a power operated motive means, a front axle and a rear axle, the axles each carrying ground engaging means on which the apparatus may move over the ground, the apparatus further including an operator's cab mounted on the body, and there being at least one working arm supported at or adjacent one end on the body, the working arm being moveable relative to the body and being adapted to carry a working implement at or adjacent a second end thereof, and wherein the front and rear axles are suspended from the body by a suspension means, the method including adjusting one only of the front and rear suspension means, to move the body relative to the ground between a fully raised position in which a plane in which an uppermost part of the body lies is at a maximum height above the ground and a fully lowered position in which the plane is at a minimum height above the ground, and wherein the method includes locking one of the axles during working operations movement of a mid point of the axle towards and away from the body, whilst permitting oscillation of the axle about an axis generally perpendicular to the axle and positioned at the mid point.

20. An axle adapted to carry a pair of ground engaging means, and to mount a suspension component, wherein the axle includes an axle body part, having a first formation by means of which a mounting member may be secured to the axle body part, and the suspension component is attached to the axle body part via the mounting member, and wherein the axle body part has a plurality of formations which enable the mounting member to be secured to the axle body part in alternative positions.

21. An axle according to claim 20 wherein the suspension component is a suspension link, strut or a damper, the mounting member being configured to mount the suspension component on the axle body part.

22. An axle according to claim 20 wherein the axle body part of the axle is generally symmetrical about a plane which extends perpendicularly of the axle body part.

23. An axle according to claim 20 wherein the axle further includes hubs provided at opposite ends of the axle.

24. An axle according to claim 23 wherein the hubs are adapted to receive ground engaging wheels thereon, and are moveable relative to the axle body part to effect steering.

* * * * *